April 21, 1953     A. O. NICHOLAS     2,635,760
CONTAINER FOR DISH-WASHING MACHINES
Filed June 16, 1948     2 SHEETS—SHEET 1
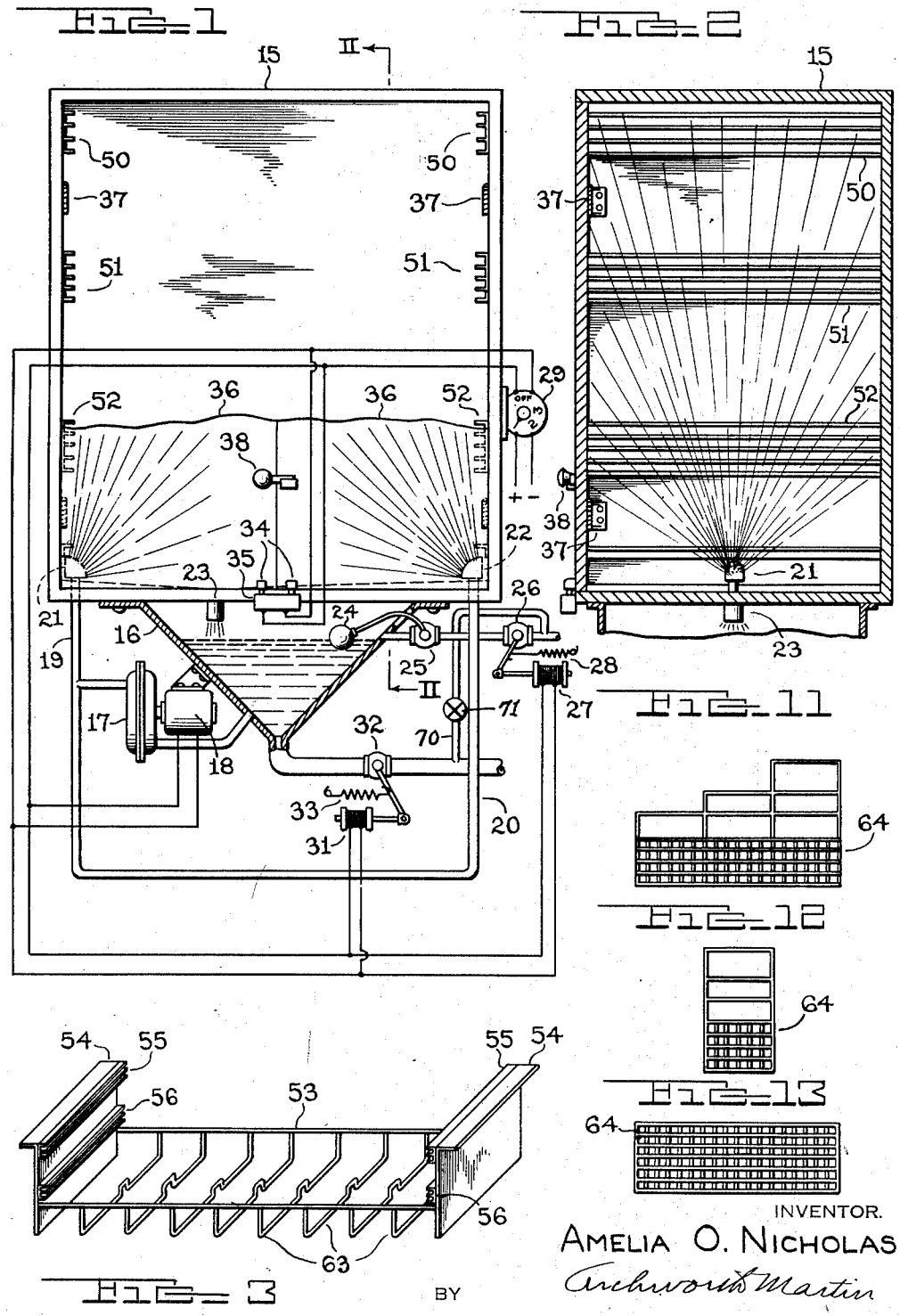
INVENTOR.
AMELIA O. NICHOLAS
ATTORNEYS.

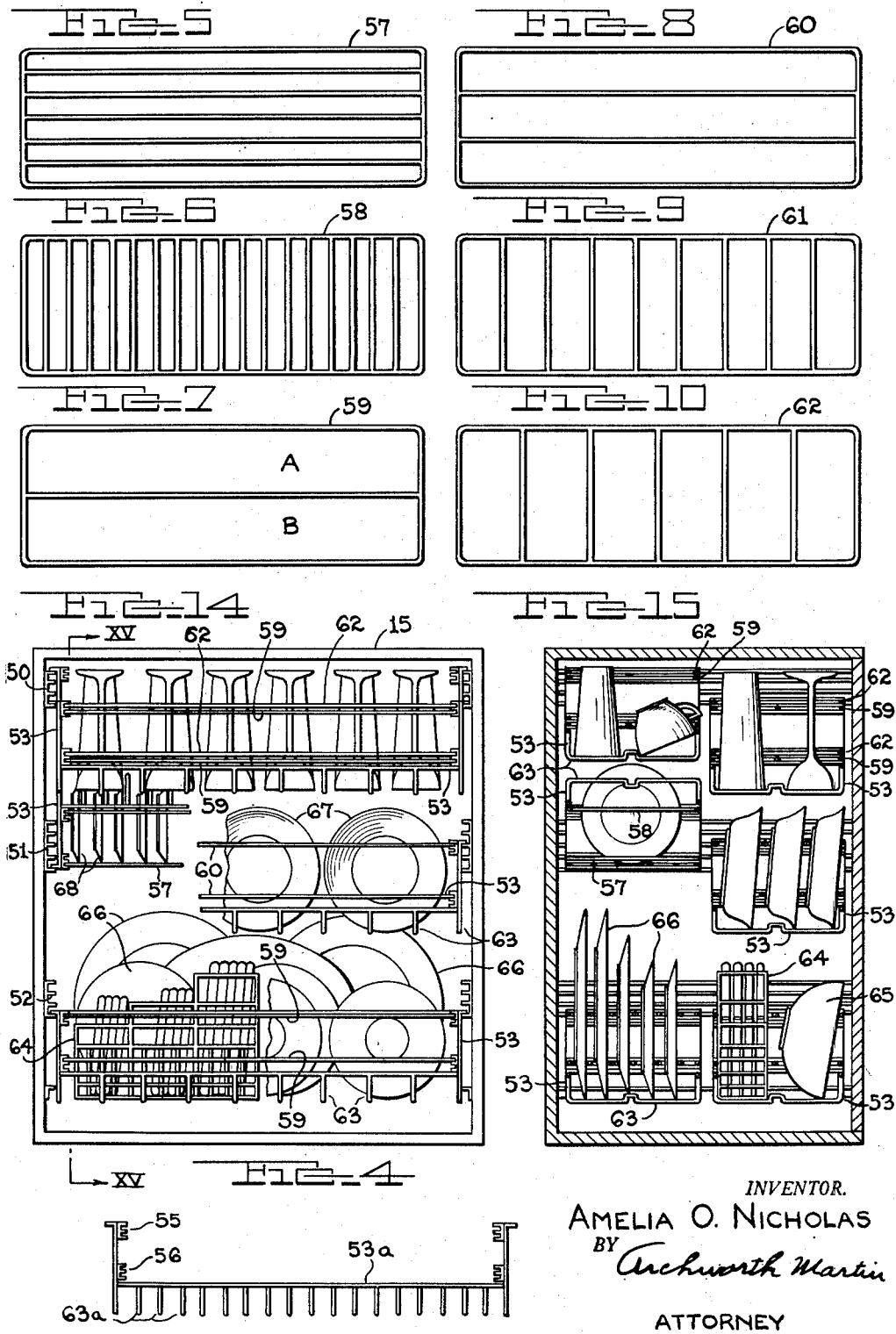

Patented Apr. 21, 1953

2,635,760

UNITED STATES PATENT OFFICE 2,635,760

CONTAINER FOR DISH-WASHING MACHINES

Amelia O. Nicholas, Butler, Pa.

Application June 16, 1948, Serial No. 33,277

1 Claim. (Cl. 211—41)

My invention relates to dish washing machines, and more particularly to a tray and rack arrangement for supporting the dishes in a washing machine cabinet.

My invention has for one of its objects the provision of a tray and rack arrangement whereby the dishes may be placed in the racks and trays at the dining table, and the tray and racks then inserted in the dish washing machine cabinet for washing, and may be permitted to remain therein after they have dried, until it is desired to again use them at meal time, whereupon the trays and racks can be removed and carried to the dining table.

Another object of my invention is to provide a dish washing machine and cabinet in combination with trays and racks wherein the trays and racks can be readily incorporated in the cabinet at various locations therein to accommodate a wide variety of dishes and utensils.

Still another object of my invention is to provide a dish washing cabinet and rack arrangement of such form that it may be inserted in a cupboard, the racks and their trays serving as part of the cupboard shelves for the storage of the dishes between meals.

In the accompanying drawings, Figure 1 is a view, partly in front elevation and partly in section, of a dish washing machine; Fig. 2 is a view taken on the line II—II of Fig. 1; Fig. 3 is a perspective view of one of the trays for supporting the dishes; Fig. 4 shows a modification thereof; Fig. 5 is a plan view of one of the racks for use with the trays of Figs. 3 and 4; Figs. 6, 7, 8, 9 and 10 show other racks for use with the trays; Fig. 11 is a side view of a rack for flatware such as knives, forks and spoons; Fig. 12 is an end view of the rack of Fig. 11; Fig. 13 is a bottom plan view thereof; Fig. 14 is a view showing one manner in which tableware of various kinds may be supported in the cabinet, and Fig. 15 is a view taken on the line XV—XV of Fig. 14.

The invention may be employed in connection with dish washing apparatus of various types, providing a cabinet similar to 15 is furnished for supporting the trays. In the present instance, a sump or water compartment is provided at 16 from which the water will be drawn by a pump 17 which is driven by a motor 18. The pump forces the water through pipes 19 and 20 to effect discharge thereof through spray nozzles 21 and 22, respectively. This water, after it is sprayed upwardly past the dishes in the cabinet, will flow back to the sump through a passageway at 23, for recirculation through the cabinet.

A float 24 that controls an inlet valve 25 automatically maintains a desired level of water in the sump 16, when an inlet valve 26 is open. During operation of the washer, the valve 26 is held open by an electromagnet 27 against the tension of a spring 28 which will automatically close the valve when the operating current for the washer is turned off. When the electric circuit is broken by movement of a switch 29 to its "off" position, the circuit through the motor 18 will be broken and also the circuit through a magnet 31 which holds a drain valve 32 closed. Upon interruption of the circuit, a spring 33 will open the valve 32 and allow the water to drain from the sump 16 to a sewer or elsewhere.

Also, a pair of latches 34 which are maintained in door-holding position by a magnet 35 will move to "open" position upon interruption of the circuit, so that the doors 36 will automatically swing open under the tension of springs in their hinges 37. The dishes will then dry readily without the necessity of removing them from the cabinet. A hand-operated latch 38 will be used when it is desired to hold the door closed during a time when the washing mechanism is not in operation.

The switch 29 is a time switch which will be manually turned to one of its positions 1-2-3, depending upon the length of washing period desired. The circuits above described will thereby be closed and the motor 18 set in operation for washing. The switch will automatically move to its "off" position during a period determined by said setting, to break the circuits.

The cabinet 15 is provided with upper, intermediate and lower slideways 50, 51 and 52 respectively, to receive trays 53 which have flanges or lips 54 that are slid into place upon the slideways at various heights depending upon the sizes of dishes that are contained on the trays.

The trays, in turn, contain slideways 55 and 56 to receive the ends of racks 57, 58, 59, 60, 61 and 62. The tray has dish supporting or spacer bars 63 to afford vertical support for dishes that are inserted through one or more of the racks.

When tumblers or the like are to be washed, the racks 59 and 62 can be placed in the tray 53 as shown in Figs. 14 and 15. Where flatware is to be washed, it will be placed in the rack or racks 64, this rack being used preferably in conjunction with a pair of racks 59 (Figs. 7 and 14) into which the rack 64 will be placed, as in space A. The remaining space B between the side bars of the racks 59 can be filled with dishes such as bowls 65.

The companion tray 53 at that level, can have racks 57, 59 or 60 inserted therein to afford support for plates such as the plates 66, the choice of racks of course depending upon the thickness of the plates. For soup dishes such as 67, the racks 60 will be used.

In order to fully utilize the space in the cabinet, the trays 53 can be inverted as at 51 in Fig. 14. In this instance, the plates 68, if thin, will be inserted between the bars 63a of tray 53a and be supported at their lower edges by the rack 57, for example. The racks 58 and 61 can also be used with this inverted arrangement of trays 53 and 53a, respectively, as shown in Fig. 15, to hold plates or saucers 68 against slipping from their vertical positions.

Skillets and pots can also be supported in proper position for washing. For example, the rack 59 may be utilized to hold skillets upright on a tray, and racks omitted from other trays in the cabinet, to accommodate pots in inverted positions.

A by-pass pipe 70 having a hand valve 71 (Fig. 1) will be used to draw off the cold water that would otherwise enter the machine when the valve 26 is first opened.

The foregoing are merely a few examples of many ways in which the trays and racks can be arranged for dishes and other articles of various shapes and sizes.

I claim as my invention:

A container device for use in dishwashing cabinets, comprising a tray provided with upstanding end walls having outstanding horizontal flanges on their outer vertical faces, adapted for sliding engagement with slideways on oppositely located cabinet walls, a pair of side rods connecting the end walls together, at the vertical edges thereof, dish-supporting bars arranged in laterally-spaced relation generally parallel to the end walls and connecting the side rods, horizontal slideways on the inner faces of the end walls, at various vertically-spaced planes, and racks slidable on the slideways into and out of the tray, some of the racks having longitudinal bars that are spaced apart in a horizontal plane and extend transversely of the first-named bars, in a higher plane, and others of the racks having horizontally-spaced bars that are parallel to the first-named bars.

AMELIA O. NICHOLAS.

References Cited in the file of this patent

UNITED STATES PATENTS

| Number | Name | Date |
|---|---|---|
| 457,318 | Haskins | Aug. 4, 1891 |
| 542,912 | Wood | July 16, 1895 |
| 1,285,000 | Blakeslee | Nov. 19, 1918 |
| 1,345,401 | Ratner | July 6, 1920 |
| 1,371,253 | Lynch | Mar. 15, 1921 |
| 1,696,342 | Bulman | Dec. 25, 1928 |
| 1,748,854 | Stockstrom | Feb. 25, 1930 |
| 1,826,951 | Patterson | Oct. 13, 1931 |
| 1,837,293 | Sanford | Dec. 22, 1931 |
| 1,960,365 | Barker | May 29, 1934 |
| 2,022,591 | Everitt | Nov. 26, 1935 |
| 2,065,391 | Nance | Dec. 22, 1936 |
| 2,119,820 | Manley | June 7, 1938 |
| 2,155,284 | Steenstrup | Apr. 18, 1939 |
| 2,163,865 | Bitney | June 27, 1939 |
| 2,266,870 | Kraeft | Dec. 23, 1941 |